(12) United States Patent
Akhmad

(10) Patent No.: US 10,211,431 B2
(45) Date of Patent: Feb. 19, 2019

(54) ELECTRIC BATTERY ASSEMBLY

(71) Applicant: BAE Systems plc, London (GB)

(72) Inventor: Mohammed-Asif Akhmad, Great Baddow (GB)

(73) Assignee: BAE Systems plc, London (GB)

(*) Notice: Subject to any disclaimer, the term of this patent is extended or adjusted under 35 U.S.C. 154(b) by 79 days.

(21) Appl. No.: 15/548,622

(22) PCT Filed: Feb. 17, 2016

(86) PCT No.: PCT/GB2016/050386
§ 371 (c)(1),
(2) Date: Aug. 3, 2017

(87) PCT Pub. No.: WO2016/132119
PCT Pub. Date: Aug. 25, 2016

(65) Prior Publication Data
US 2018/0026235 A1   Jan. 25, 2018

(30) Foreign Application Priority Data
Feb. 18, 2015 (GB) .................................. 1502730.3

(51) Int. Cl.
*H01M 2/02* (2006.01)
*H01M 10/42* (2006.01)
*H01M 10/44* (2006.01)

(52) U.S. Cl.
CPC ........... *H01M 2/02* (2013.01); *H01M 10/425* (2013.01); *H01M 10/4207* (2013.01); *H01M 10/441* (2013.01)

(58) Field of Classification Search
CPC ........... H01M 10/4207; H01M 10/425; H01M 10/441; H01M 10/0427; H01M 2/02;
(Continued)

(56) References Cited

U.S. PATENT DOCUMENTS 4,209,091 A   6/1980   Lieberman
2013/0071705 A1   3/2013   Frutschy et al.
(Continued)

FOREIGN PATENT DOCUMENTS

EP   2071648 A1   6/2009
JP   2001307704 A1   4/2003
(Continued)

OTHER PUBLICATIONS

International Preliminary Report on Patentability of International Application No. PCT/GB2016/050386, dated Aug. 31, 2017, 6 pages.
(Continued)

*Primary Examiner* — Carlos Barcena
(74) *Attorney, Agent, or Firm* — Maine Cernota & Rardin

(57) ABSTRACT

There is disclosed an electric battery assembly comprising: a plurality of electric batteries arranged in an array, an interconnection for connecting batteries in the array to provide a common power output; a plurality of shock absorbent housings, wherein each electric battery is provided within a shock-absorbent housing. The shock absorbent housing may have the form of a blister, which may be flexible and which may be filled with a shock-mitigating material.

14 Claims, 3 Drawing Sheets

(58) Field of Classification Search
CPC .. H01M 2/0202; H01M 2/021; H01M 2/0222; H01M 2/10; H01M 2/1022; H01M 2/1038; H01M 2/1077; H01M 2/1094
See application file for complete search history.

(56) References Cited

U.S. PATENT DOCUMENTS

2015/0064521 A1      3/2015  Watanabe et al.
2015/0373831 A1*   12/2015  Rogers .................... H01L 23/18
                                                                429/121

FOREIGN PATENT DOCUMENTS

| JP | 2003123714 A1 | 4/2003 |
| WO | 2013153588 A1 | 10/2013 |
| WO | 2012132186 A1 | 7/2014 |

OTHER PUBLICATIONS

International Search Report and Written Opinion of International Application No. PCT/GB2016/050386, dated May 9, 2016, 10 pages.
Search Report under Section 17(5) of Great Britain Application No. GB1502730.3, dated Jan. 13, 2016, 4pages.
European Search Report of European Application No. EP15275153, dated Sep. 2, 2015, 6 pages.

* cited by examiner

ELECTRIC BATTERY ASSEMBLY

RELATED APPLICATIONS

This application is a national phase application filed under 35 USC § 371 of PCT Application No. PCT/GB2016/050386 with an International filing date of Feb. 17, 2016, which claims priority of GB Patent Application GB1502730.3 filed Feb. 18, 2015 and EP Patent Application EP15275153.3 filed Jun. 17, 2015. Each of these applications is herein incorporated by reference in its entirety for all purposes.

FIELD OF THE INVENTION

The present invention relates to an electric battery assembly.

BACKGROUND OF THE INVENTION

Typically an electric battery is provided as a monolithic device and/or provided in a rigid housing. Accordingly typical batteries represent a single point of failure.

SUMMARY OF THE INVENTION

According to the present invention there is provided an electric battery assembly comprising: a plurality of electric batteries arranged in an array, an interconnection for connecting batteries in the array to provide a common power output; a plurality of shock absorbent housings, wherein each electric battery is provided within a shock-absorbent housing.

Each shock absorbent housing may have the form of a blister, which may be flexible and which may be filled with a shock-mitigating material. Such shock-mitigating material may comprise air and/or may comprise a shear-thickening fluid and/or may comprise a hard resin.

Typically the shock absorbent housings are affixed to a flexible substrate, which may be formed from a reinforced composite.

The array of batteries may be arranged in a substantially planar form and the interconnection may comprise: a first conductive member suspended over the array of batteries; a second conductive member suspended under the array of batteries, wherein for each battery there is provided a first connection extending between a positive electrode of the battery and the first conductive member and for each battery there is provided a second connection extending between a negative electrode of the battery and the second conductive member.

Where such interconnections are provided, the first conductive member may be in the form of a sheet and the second conductive member may be in the form of a sheet.

There may be a single battery provided in each shock-absorbent housing.

Where shock absorbent housings are affixed to the flexible substrate, the shock absorbent housings may taper as they extend from the flexible substrate and be separated from one another to permit flexion. In such circumstances, the shock absorbent housings may have a substantially hemi-spherical form.

Each of the plurality of batteries may have a substantially planar form, such as a disc.

At least one of the first or second conductive members may be a mesh, and further still, may be a mesh comprising fuse wire.

Where the shock absorbent housing has the form of a blister filled with shock-mitigating material, then at the blister, the volume ratio of the battery to the shock-mitigating material may be in the range of 1:1 to 1:10, and in particular may be in the range 2:3 to 1:5.

As such, there can be provided a flexible, or in other words deformable, power source which may be applied to surfaces to match the contours of that surface.

As such there can be provided a power source where localised damage need not render the entire supply inoperable.

BRIEF DESCRIPTION OF THE DRAWINGS

So that the invention may be better understood, an embodiment shall now be described with reference to the following figures, of which.

DETAILED DESCRIPTION

Figure 1:
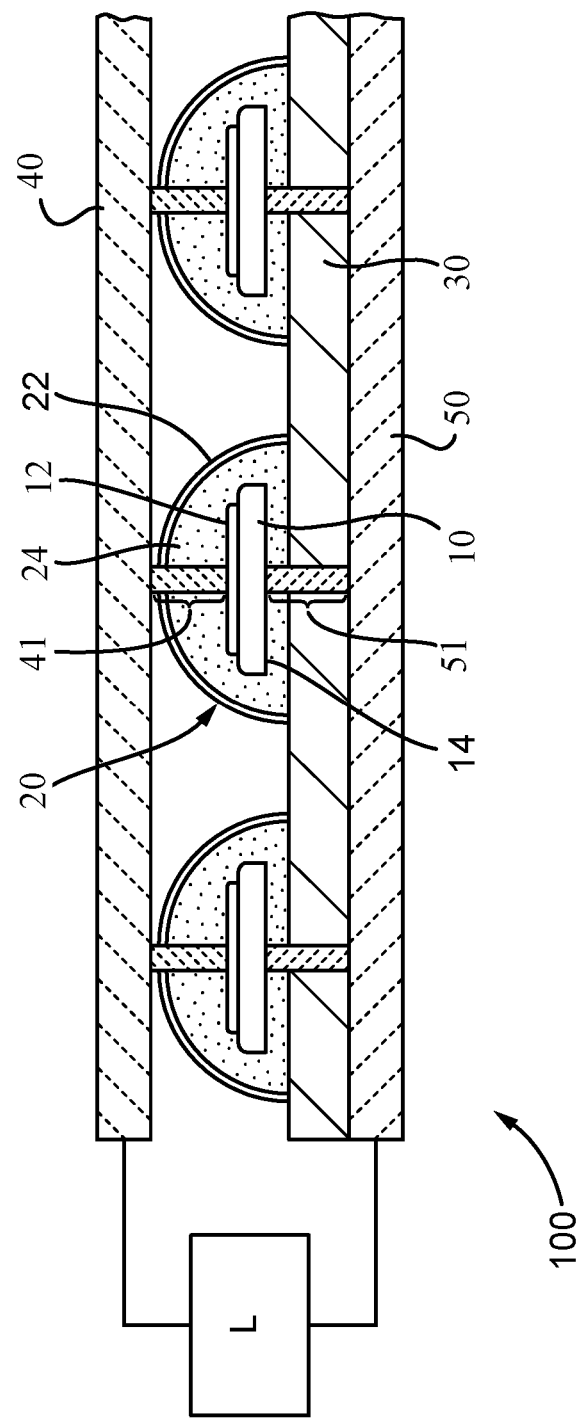
FIG. 1 shows schematically an electric battery assembly according to the present invention and connected to an electrical load.

An electric battery assembly 100 has a substantially planar form and comprises a plurality of electrical batteries 10. The plurality of electrical batteries 10 are arranged as an array within the plane defined by the assembly 100.

Each battery cell 10 may be of the 'button' or 'coin' variety (i.e. having the form of a disc, and e.g. as shown each being substantially coplanar or at least parallel with each other and the general plane of the assembly 100) and rated 3V-9V.(Other embodiments of the invention may comprise batteries with ratings higher than 9V.) Each battery comprises a negative electrode 14 and a positive electrode 12. In the present embodiment, the orientation of each battery is identical with respect to the plane defined by the assembly 100. That is to say, all of the positive electrodes 12 are at one side or surface of the array (the upper side as shown in the figures), and all of the negative electrodes 14 are on the other side or surface of the array (the lower side as shown in the figures).

In an exemplary embodiment the battery cell 10 can be taken to be approximately of radius 1 cm (0.01 m) and height 0.03 cm (0.003 m), and thus having a volume of approximately 0.9 cm$^3$ ($9 \times 10^{-7}$ m$^3$).

The assembly 100 also comprises a plurality of shock absorbing housings 20 affixed to a substrate 30. The substrate 30 has the form of a flexible sheet of dielectric material.

The flexible substrate 30 may comprise a reinforced composite such as glass fibre reinforced polymer or Kevlar™.

Each of the shock absorbing housings 20 comprise a chamber formed by a blister or pouch 22 which houses a battery 10 and also a shock mitigating material 24. The blister or pouch 22 is formed from a tough flexible material such as a plastics material; in the present embodiment the blister or pouch 22 is formed from polyethylene (LDPE) sheeting shaped in the desired form.

The shock mitigating material 24 is air, in this embodiment. Other electrically insulating gases and/or liquids could be used in other embodiments. Gases, being compressible, are particularly suitable for use as the shock mitigating material 24.

Each shock absorbing housing 20 is separated from the other housings 20. Further, each blister 22 generally defines the boundary of the housing 20 and has a tapering form, in this embodiment a hemisphere. As such, the array of housings 20 tend not to abut one another if the flexible substrate 30 deforms, unless a significant curvature is applied; thus the array of shock absorbing housings 20 does not tend to interrupt flexion and so a substantially conformal assembly 100 is provided.

In an exemplary embodiment, the blister can be taken to be a hemispherical chamber of approximate radius 1.3 cm (0.013 m) and therefore having a volume of approximately 4.6 cm$^3$ (4.6×10$^{-6}$ m$^3$). Given the slight thickness of the blister wall, the internal volume of the blister can be taken to be approximately equal to 4.6 cm$^3$.

The positive electrodes 12 of the batteries 10 are connected to a common positive electrode 40 which has the form of a sheet of conductive mesh. Other conductive sheets of material may be suitable for use as a conductive member for the common positive electrode 40, provided that the flexibility is appropriate.

A first connection 41 extends upwards (with respect to the figure) from the positive electrode of each battery 10 through the shock mitigating material 24, through the blister 22 and onto the common electrode 40. Thus the connection 41 electrically connects the positive electrode 12 of each battery 10 to the common positive electrode 40.

Figure 3:
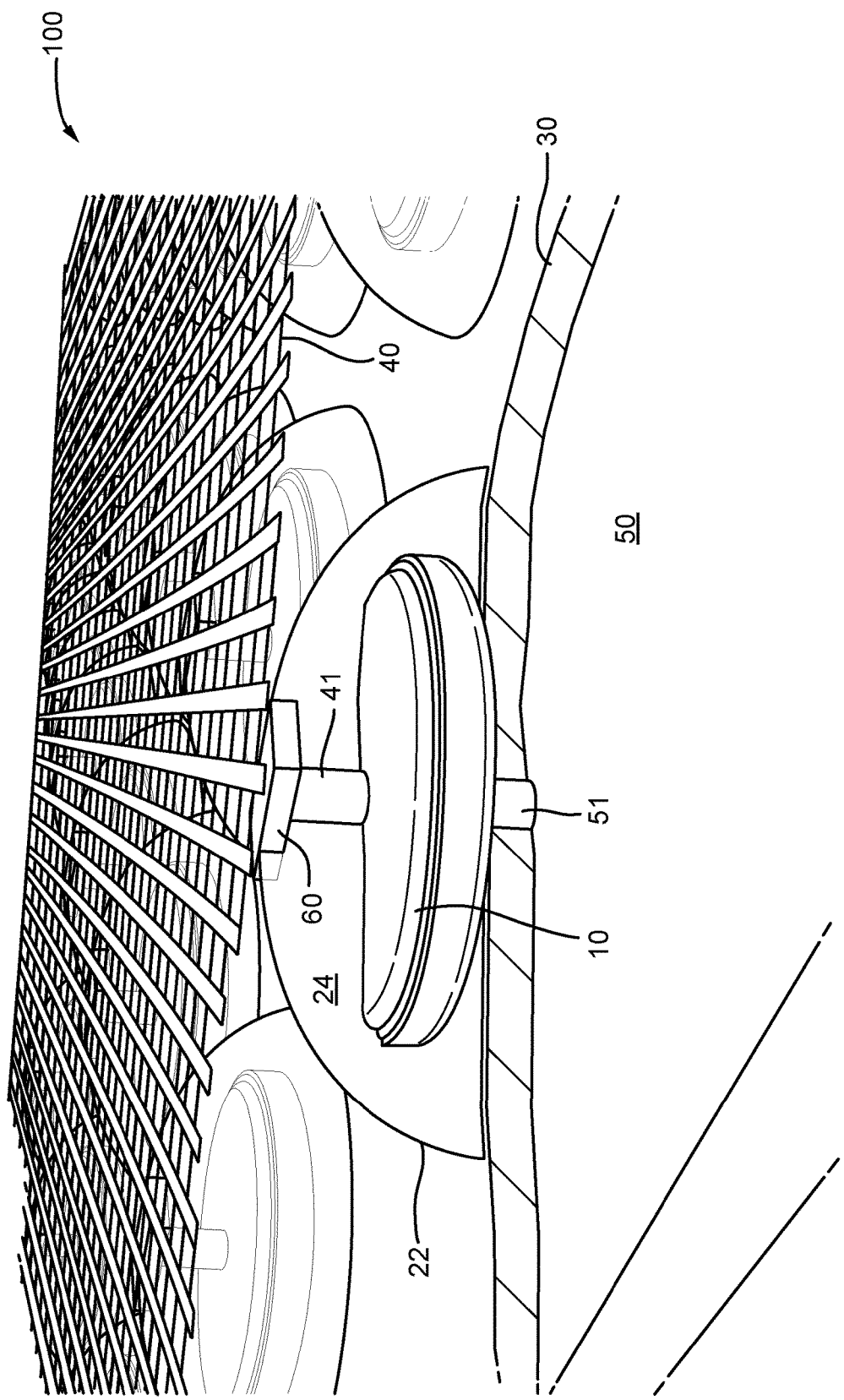
FIG. 3 shows a cut-away view of the assembly shown in FIG. 2.

Optionally, and as shown in FIG. 3, a further electrical unit 60 may be electrically interposed between the common positive electrode 40 and the first connection 41. Such a further unit could comprise surge protection circuitry, or a fuse. Alternatively or additionally, such unit 60 could comprise components for monitoring and reporting the electrical characteristics (such as remaining charge) of the associated battery cell. In other embodiments, such components could be integrated into the blister otherwise. Accordingly, the provisions for managing and operating a partially damaged assembly are increased.

The negative electrodes 14 of the batteries 10 are connected to a common negative electrode 50 which has the form of a sheet of conductive mesh. Other conductive sheets of material may be suitable for use as a conductive member for the common negative electrode 50, provided that the flexibility is appropriate.

A second connection 51 extends downwards (with respect to the figure) from the negative electrode 14 of each battery 10 through the shock mitigating material 24, through the flexible substrate 30 and onto the common electrode 50. Thus the connection 51 electrically connects the negative electrode 14 of each battery 10 to the common negative electrode 50.

It will be appreciated by the skilled man that the assembly 100 effectively connects the plurality of batteries 10 in parallel. Thus the battery assembly 100 may be used to drive an electrical load L with direct current by connecting the load L between the common positive electrode 40 and the common negative electrode 50.

Figure 2:
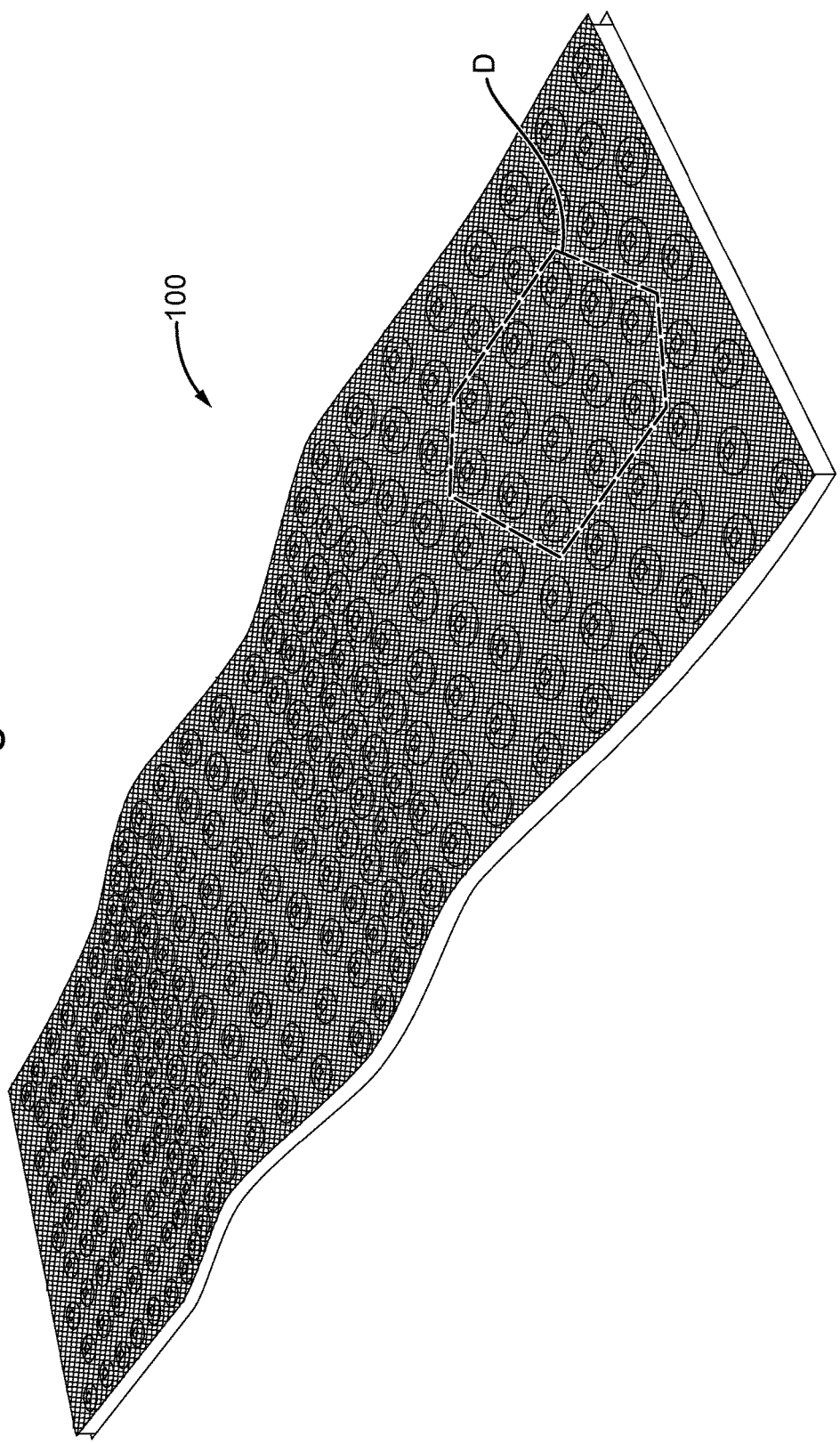
FIG. 2 shows a perspective computer generated image view of an electric battery assembly according to the present invention.

In operation, the assembly may operate as a portable power supply and be provided as a continuous sheet of material, as shown in FIG. 2, for integration with portable electrical devices.

The flexibility of the assembly 100 enables it to be applied conformally to surfaces, making it suitable for retrofitting and making it suitable for use on irregular surfaces. Thus the assembly 100 can be suitable for use with a wide range of devices.

The provision of a number of batteries 10 connected in parallel offers some redundancy in the assembly. The redundancy of the assembly 100 enables it to operate despite areas of damage, e.g. if area D of FIG. 2 were to be rendered inoperable, the assembly 100 would still function to supply power from the remaining undamaged portions.

In the above embodiments each battery cell 10 is surrounded on all sides by the shock mitigating material 24, which in such embodiments is a compressible gas namely air. Taking the dimensions of the battery and the blister chamber as determined above to be approximately 0.9 cm$^3$ and 4.6 cm$^3$ respectively, the battery volume represents 16% of the blister chamber volume. Further, the volume ratio of the battery 10 to the shock mitigating material 24 is approximately 1:4.

Other embodiments may have different volume ratios between the battery 10 and the shock mitigating material 24. However a ratio in the range of 1:1 to 1:10 is contemplated as suitable for absorbing shock or mitigating shock, with a ratio in the range of 2:3 to 1:5 being contemplated as particularly suitable.

In variants of the above embodiments, one or both of the common positive electrode 40 or the common negative electrode 50 may be formed from a surge-defensive member, such that the effects of any undesirably high currents are localised. One surge-defensive member contemplated has the form of a wire mesh where the wires are the fuse wire type and have predetermined properties such that they tend to melt above a certain current.

In variants of the above embodiments the button cell batteries could be replaced with a lithium ion polymer battery particularly of the type being mouldable so as to either fit better into the blister or absorb shock itself through deformation. Typically such batteries may be provided in a pouch formed of metallised sheeting, and be provided with charge protection circuitry.

In variants of the above embodiments, the assembly may be provided additionally or instead of other charging systems, with conductive metal loops to facilitate inductive charging at a corresponding charging station. A single inductive loop may be provided for the entire array, or there may be provided a loop for each battery.

In variants of the above embodiments the assembly may be additionally provided with a battery management system. Such a system could comprise a sensor or sensors for monitoring the environment in which the assembly is deployed (e.g. so as to ascertain ambient temperature profile, accrued deployment time), a sensor or sensors for monitoring the parameters of battery performance (e.g. number of charges/discharges, present operating voltage), and a processor working with an array of switches for determining and executing a strategy for driving the batteries to assist with performance goals. Such an environmental sensor may be uniquely associated with each battery, or may collect data on behalf of a plurality of batteries. Such a battery parameter sensor may be uniquely associated with each battery, or may collect data on behalf of a plurality of batteries.

Such a battery management system could tend to identify defective batteries and allow them to be disconnected from the rest of the array as appropriate.

In variants of the above embodiments, the shock mitigating material 24 could be a material other than a gas.

The shock mitigating material could be a shear-thickening fluid. The shock mitigating material could be a hard resin, especially if it has a shock-absorbing capability such as a resilient/compressible characteristic.

Combinations of materials could be used as the shock mitigating material 24. Further, colloids, and particularly gels and foams may be used as the shock mitigating material.

In some embodiments the cell can be hard-potted and provided in the blister with a further shock-absorbent shock mitigating material In other embodiments, where more rigid shock-mitigating materials 24 are used, the housing may absorb shock through the resilience of the blister wall itself.

What is claimed is:

1. An electric battery assembly comprising:
   a plurality of electric batteries arranged in an array;
   an interconnection for connecting batteries in the array to provide a common power output; and
   a plurality of shock absorbent housings,
   wherein each electric battery is provided within a shock-absorbent housing, and wherein the shock-absorbent housing has the form of a flexible blister.

2. The electric battery assembly according to claim 1 wherein the flexible blister is filled with a shock-mitigating material.

3. The electric battery assembly according to claim 2 wherein the shock-mitigating material comprises air.

4. The electric battery assembly according to claim 1 wherein the shock absorbent housings are affixed to a flexible substrate.

5. The electric battery assembly according to claim 4 wherein the flexible substrate is formed from reinforced composite.

6. The electric battery assembly according to claim 4 wherein the shock absorbent housings taper as they extend from the flexible substrate and are separated to permit flexion.

7. The electric battery assembly according to claim 1 wherein the array of batteries is arranged in a substantially planar form and the interconnection comprises:
   a. a first conductive member suspended over the array of batteries; and
   b. a second conductive member suspended under the array of batteries;
   wherein for each battery there is provided a first connection extending between a positive electrode of the battery and the first conductive member, and
   for each battery there is provided a second connection extending between a negative electrode of the battery and the second conductive member.

8. The electric battery assembly according to claim 7 wherein the first conductive member is in the form of a sheet and wherein the second conductive member is in the form of a sheet.

9. The electric battery assembly according to claim 8 wherein at least one of the first or second conductive members is a mesh.

10. The electric battery assembly according to claim 9 wherein the mesh comprises fuse wire.

11. The electric battery assembly according to claim 1 wherein there is a single battery provided in each shock-absorbent housing.

12. The electric battery assembly according to claim 1 wherein the shock absorbent housings have a substantially hemi-spherical form.

13. The electric battery assembly according to claim 1 wherein each of the plurality of batteries has a substantially planar form.

14. The electric battery assembly according to claim 1 wherein the shock-absorbent housing has the form of a blister filled with shock-mitigating material, and wherein at the blister, the volume ratio of the battery to the shock-mitigating material is in the range of 1:1 to 1:10.

* * * * *